Adams et al.

[11] Patent Number: 4,661,589
[45] Date of Patent: Apr. 28, 1987

[54] PROCESS FOR PREPARING HYDROXYALKYLCELLULOSE ETHERS

[75] Inventors: Glen L. Adams, Baton Rouge, La.; Christopher D. Messelt, Gales Ferry, Conn.

[73] Assignee: The Dow Chemical Company, Midland, Mich.

[21] Appl. No.: 751,338

[22] Filed: Jul. 2, 1985

[51] Int. Cl.$^4$ .................... C08B 11/08; C08B 11/193
[52] U.S. Cl. ........................ 536/91; 536/90; 536/95
[58] Field of Search ............... 536/91, 95, 96

[56] References Cited

U.S. PATENT DOCUMENTS

| 2,033,126 | 3/1936 | Dreyfus | 536/96 |
| 2,047,189 | 7/1936 | Berger et al. | 536/96 |
| 2,055,892 | 9/1936 | Dreyfus | 536/96 |
| 2,173,471 | 9/1939 | Broderick | 536/96 |
| 2,847,411 | 8/1958 | Mitchell et al. | 536/96 |
| 3,045,007 | 7/1962 | Mitchell et al. | 536/96 |
| 3,388,082 | 6/1968 | Rodgers et al. | 536/91 |
| 3,676,055 | 7/1972 | Smith | 536/95 |
| 4,310,663 | 1/1982 | Hilbig et al. | 536/91 |
| 4,456,751 | 6/1984 | Messelt et al. | 536/90 |
| 4,477,657 | 10/1984 | Strange et al. | 536/95 |

FOREIGN PATENT DOCUMENTS 59-49201  3/1984  Japan .................... 536/91

Primary Examiner—Ronald W. Griffin

[57] ABSTRACT

Alkylene oxide is added as a vapor in preparing $C_2$ or higher hydroxyalkylcellulose ethers and hydroxyalkylalkylcellulose ethers by continuously adding the reagents to alkali cellulose at elevated temperatures.

34 Claims, No Drawings

PROCESS FOR PREPARING HYDROXYALKYLCELLULOSE ETHERS

BACKGROUND OF THE INVENTION

This invention relates to a process for the preparation of hydroxyalkylcellulose ethers, more particularly to hydroxyalkylalkylcellulose ethers having $C_2$ or higher hydroxyalkoxyl functionalities.

Hydroxyalkylcellulose ethers and hydroxyalkylalkylcellulose ethers having $C_2$ or higher hydroxyalkoxyl functionalities are typically prepared by reacting alkali cellulose with a $C_2$ or higher alkylene oxide and an etherifying agent which is not an alkylene oxide such as an alkyl chloride, dialkyl sulfate or halocarboxylic acid. In such processes, the alkylene oxide and the etherifying agent are charged into a reaction vessel containing alkali cellulose under reaction conditions, including elevated temperatures, to obtain the desired cellulose ether molecule.

Unfortunately, the alkylene oxide can undergo various side reactions. For example, a molecule of alkylene oxide can react with a molecule of water and a second alkylene oxide molecule to form a glycol ether. The alkylene oxide can also react with the etherifying agent to form ethers therewith. Such side reactions generate impurities which must be removed from the product, and the overall efficiency of the etherification reaction is drastically reduced. For example, in a typical reaction of alkali cellulose with propylene oxide and methyl chloride under conventional conditions, only about 10 to 25 weight percent of the propylene oxide employed reacts with the alkali cellulose as desired.

Recently, in U.S. Pat. No. 4,477,657, a staged continuous addition process for reacting alkylene oxide with alkali cellulose is disclosed. In that process, the efficiency of the alkylene oxide reaction is increased. However, the reaction products can contain high levels of insolubles when preparing hydroxyalkylcellulose ethers and hydroxyalkylalkylcellulose ethers with a high hydroxyalkoxyl substitution, i.e., greater than about 5 weight percent hydroxyalkoxyl substitution.

Accordingly, a process for preparing hydroxyalkylcellulose ethers and mixed hydroxyalkylalkylcellulose ethers with high hydroxyalkoxyl substitution wherein the efficiency of the alkylene oxide reaction is increased and the reaction product has a low level of insolubles would be highly desirable.

SUMMARY OF THE INVENTION

This invention is such a process. In the process, hydroxyalkylcellulose ethers and mixed hydroxyalkylalkylcellulose ethers having a high $C_2$ or higher hydroxyalkoxyl molar substitution are prepared. The process comprises forming a reaction mass comprising cellulose and an amount of an alkali metal hydroxide at least sufficient to break up the crystallinity of the cellulose and to catalyze a reaction between the cellulose and an alkylene oxide. To this reaction mass, a $C_2$ or higher alkylene oxide and optionally when preparing mixed hydroxyalkylalkylcellulose ethers, an etherifying agent other than an alkylene oxide is continuously added under conditions comprising an elevated temperature such that the alkylene oxide and optional etherifying agent react with the cellulose to attach ether groups thereto. The process is improved by adding the alkylene oxide in the form of a vapor.

The invention is useful in efficiently reacting large amounts of alkylene oxide with alkali cellulose in preparing $C_2$ or higher hydroxyalkylcellulose ethers and hydroxyalkylalkylcellulose ethers. The celluose ethers prepared in the process have a lower insolubles level along with high alkyene oxide efficiency compared to high hydroxyalkoxyl substituted hydroxyalkylcellulose ethers prepared in the staged continuous addition reaction without the vaporous addition of alkylene oxide. Such cellulose ethers are useful as binders and thickeners in aqueous systems, film formers and in pharmaceutical and food uses.

DETAILED DESCRIPTION OF THE INVENTION

This invention is an improvement on the staged continuous addition process for preparing $C_3$ or higher hydroxyalkylcellulose ethers disclosed in U.S. Pat. No. 4,477,657.

The process of this invention is preferably, but not necessarily, carried out in stages, with a first hydroxyalkylation reaction being performed in the presence of relatively small amounts of the alkali metal hydroxide and, after the hydroxyalkylation reaction, additional alkali metal hydroxide is added and the etherification reaction is completed. However, when hydroxyalkylcellulose ethers are prepared, a one-stage reaction is preferred.

Cellulose derived from known sources such as, for example, cotton linters and wood pulp, is employed as a raw material. To etherify the cellulose, the cellulose is thoroughly mixed with a concentrated aqueous alkali metal hydroxide solution (hereinafter "caustic solution"). The caustic solution performs a three-fold function in the etherification reaction: it breaks up the crystalline structure of the cellulose; it catalyzes the alkylene oxide/cellulose reaction; and it reacts with cellulose and the etherifying agent to attach ether groups to the cellulose. The caustic solution is preferably a sodium hydroxide solution containing at least about 20, preferably at least about 40, more preferably at least about 50, weight percent sodium hydroxide, although any concentration sufficient to perform the functions can be employed.

When a one-stage reaction is run, sufficient caustic solution is added to the cellulose at the outset to fulfill all of the aforementioned functions.

In a two-stage reaction, the amount of caustic employed at the outset is advantageously not substantially higher than required to break up the crystalline structure of the cellulose. Failure to break up said crystallinity can result in a product containing significant quantities of fibers and other insoluble materials as well as irregular substitution. When lower fiber contents are desired, slightly higher caustic levels are advantageously employed in the first stage of the reaction. Typically, in a two-stage reaction, from about 0.1 to about 0.8, preferably about 0.15 to about 0.5, part of caustic is employed per part by weight cellulose in the first stage. An excess amount of caustic solution tends to reduce the efficiency of the alkylene oxide reaction and is therefore avoided. In the second stage of the two-stage reaction, sufficient additional caustic is added to obtain the desired amount of reaction of the cellulose, caustic and etherifying agent (hereinafter "incremental amount").

The cellulose and caustic solution are thoroughly mixed to uniformly distribute the caustic solution throughout the cellulose. Such mixing may be performed in the reactor or as a pre-treatment step prior to charging the reactor with the reaction mass. The mixing can be performed at any effective temperature. Such temperature can vary, and typically ranges from about 20° to about 120° C., although any temperature sufficient to provide uniformly distributed alkali cellulose can be employed.

To minimize degradation of the cellulose, the alkylene oxide and etherifying agent reactions are advantageously performed in the substantial absence of air or oxygen.

In both the one- and two-stage embodiments of this process, the reactor containing the reaction mass comprising the cellulose and caustic is heated to a temperature such that the cellulose can react with the alkylene oxide and the etherifying agent. In general, the reaction mass is heated to a temperature of about 30° to about 140° C., preferably about 40° to about 120° C., more preferably about 60° to about 95° C. Higher temperatures are generally undesirable due to increased degradation of the cellulose. At lower temperatures, the etherification reactions generally do not proceed at a commercially acceptable rate.

Both the one- and two-stage continuous addition processes of U.S. Pat. No. 4,477,657 can be improved by adding the alkylene oxide in the form of a vapor. Moreover, the preparation of any cellulose ether employing an alkylene oxide as a reagent in such processes can likewise be improved. Suitable cellulose ethers are, for example, hydroxyethylcellulose, hydroxyethyl methylcellulose, ethylhydroxypropyl methylcellulose, hydroxypropyl ethylcellulose, hydroxypropyl methylcellulose, hydroxypropylcellulose, hydroxybutylmethylcellulose, and the like. By vapor is meant that the alkylene oxide is added in the gaseous state. Cellulose ethers disclosed in U.S. Pat. No. 3,388,082, which have a hydroxyalkoxyl substitution of from at least about 8 to at least about 30, preferably at least about 21 to at least about 30 weight percent, are preferred.

The alkylene oxide can be added in any manner which will effectively vaporize all of the reaction amount of alkylene oxide. For example, the alkylene oxide can be heated above its vaporization temperature, and then added to the reaction mass. Most preferably, the pressure in the reaction vessel is lowered sufficiently to provide an effective vacuum. The reaction amount of alkylene oxide is then added to the vessel under effective reaction conditions such that it flashes as a vapor as it enters the reaction vessel. The initial pressure should be sufficiently low so that all of the reaction amount of alkylene oxide can flash upon addition to the vessel.

The extent the pressure is lowered is affected by the temperature of the reactor. For example, the higher the temperature of the reactor, the less the pressure can be dropped to vaporize the alkylene oxide. Typically, when the reaction is run between about 40° to about 140° C., the initial pressure can be less than about 400 mmHg, preferably less than about 175 mmHg and more preferably less than about 120 mmHg; although any pressure sufficient to vaporize the reaction amount of the alkylene oxide at the given temperature is suitable.

It is desirable to control the rate of the alkylene oxide addition to the reactor. By controlling the rate of addition, the efficiency of the reaction and the distribution of the alkylene oxide on the cellulose backbone can be improved. Advantageously, the rate of addition should be about equal to the rate of reaction thereof, so that at no time during the reaction are there large quantities of unreacted alkylene oxide present in the reaction vessel. Since the rate of the reaction can vary somewhat with temperature and pressure, the rate can vary as well. Typically, the rate of addition can vary from about 0.003 to about 0.04 pounds per minute per pound of cellulose, preferably from about 0.006 to about 0.01 pounds per minute per pound of cellulose. The lower limit on the rate of addition can be determined by economic considerations; i.e., how long the reaction should take.

In the one-stage embodiment of this invention, the alkylene oxide is continuously added to the heated reaction mass under conditions such that the alkylene oxide can react with the cellulose to attach hydroxyalkoxyl substituents thereto. The amount of alkylene oxide employed can vary somewhat according to the amount of hydroxyalkoxyl substitution desirably attached to the cellulose. In general, from about 0.4 to about 8, preferably about 0.4 to about 2 moles of the alkylene oxide are employed per mole of cellulose pulp. The addition of the alkylene oxide is preferably performed continuously over the period of the reaction but may be done as a series of additions of small portions of the total amount of alkylene oxide to be loaded. As used herein, the term "continuously" is used to include both continuous addition and the addition of a reactant as a series of additions of small portions of the total amount of that reactant to be loaded. The addition of alkylene oxide is done under conditions such that hydroxyalkoxyl groups become attached to the cellulose. In particular, the temperature in the reactor is maintained within the aforementioned ranges.

A $C_2$ or higher unsubstituted or inertly substituted alkylene oxide is employed. Preferably, the alkylene oxide is linear and unsubstituted. More preferably, the alkylene oxide is ethylene oxide, propylene oxide or butylene oxide with propylene oxide being the most preferred. By "inertly substituted" is meant that the alkylene oxide contains no functional groups which interfere with the hydroxyalkylation or etherification reactions.

In the one-stage embodiment of this invention, when preparing mixed hydroxyalkylalkylcellulose ether, the etherifying agent is also added continuously to the heated reaction mass under conditions such that ether groups become attached to the cellulose, although vaporization addition is not required. The addition of etherifying agent may be done concurrently with or after the alkylene oxide addition. Again, the rate of addition of the etherifying agent is advantageously approximately equal to the rate of reaction thereof so that at no time are there large amounts of unreacted etherifying agent present in the reactor. Typically, the etherifying agent is added over about a·0.5 to about a 20 hour period. As with the alkylene oxide addition, the addition of the etherifying agent may be performed continuously or as a series of additions of small portions of the total amount of etherifying agent to be added. The temperature in the reaction vessel during such addition is maintained within the aforementioned ranges.

The etherifying agent employed herein is any suitable reagent other than an alkylene oxide which reacts with cellulose under alkaline conditions to attach ether substituents thereto. Commonly employed etherifying agents include carboxyalkylating agents and alkylating agents. Typical carboxyalkylating agents include haloaliphatic carboxylic acids such as chloroacetic acid.

Alkylating agents include the alkyl halides and dialkyl sulfates, especially the $C_1$-$C_{12}$ alkyl halides and $C_1$-$C_{12}$ dialkyl sulfates. Preferably, the alkyl group contains no more than four carbon atoms, and more preferably it is either methyl or ethyl. Most preferably, the alkylating agent is methyl chloride or ethyl chloride. The amount of etherifying agent employed depends somewhat on the amount of alkoxyl substitution desired on the product. However, in general, from about 1 to about 8, preferably from about 1.3 to about 6, more preferably from about 2 to about 4 moles of etherifying agent are employed per mole of cellulose. Mixtures of two or more of the aforementioned etherifying agents may, of course, be employed.

In the two-stage embodiment of the invention, the alkylene oxide is first continuously added to the reaction mass under the conditions described hereinbefore, with the exception that the reaction mass contains only enough caustic to break up the crystallinity of the cellulose. After the alkylene oxide addition is complete, an incremental amount of caustic solution is added to the reaction vessel. This incremental amount of caustic solution is sufficient to catalyze the subsequent reaction of the cellulose with the etherifying agent so that the desired amount of ether groups becomes attached to the cellulose. In general, from about 0.3 to about 2.0, preferably about 0.35 to about 1.0, parts of caustic are employed per part by weight of cellulose pulp. A larger incremental amount of caustic will generally result in a higher amount of ether substitution on the cellulose. The addition of this incremental amount of caustic solution is done with agitation to uniformly disperse the caustic solution throughout the reaction mass. This incremental amount of caustic can be added to the reaction mass while the reaction mass is at reaction temperatures. Alternatively, the reaction mass can be cooled below reaction temperatures (i.e., below 40° C.) for the addition of the incremental amount of caustic.

Preferably, in the two-stage reaction following the addition of alkylene oxide, and prior to the addition of the incremental amount of caustic solution, the reactor is maintained at the reaction temperature for a short period to allow the hydroxyalkoxyl reaction to be completed. Typically, a period of about 15 minutes to about 2 hours, preferably about 15 minutes to about 45 minutes, is desirable.

Following the addition of the incremental amount of caustic solution in the two-stage reaction, the etherifying agent is continuously added to the reactor. As with the alkylene oxide addition, this addition is conducted under conditions such that the etherifying agent reacts with the cellulose to attach a desired amount of ether substituents thereto. The general conditions of the addition of the etherifying agent are as described hereinbefore.

Following the addition of all reagents in either the one- or two-stage process, the reaction vessel is advantageously and preferably maintained at the reaction temperature for a short period, to complete the alkylation reactions. Such period can be from about 15 minutes to about 2 hours, although any period sufficient to complete the etherification can be employed. Following completion of the etherification reactions, the product is recovered, purified, ground or packaged as desired in any conventional manner. Purification is typically effected by simple washing with water at a temperature above the gel point of the product to remove salts therefrom. The product may be ground, if desired, using conventional grinding apparatus such as a ball mill. Granulated products may also be prepared from the recovered product in conventional manner. The product may be crosslinked with glyoxal or other dialdehydes.

It has been found that in the practice of this invention, the efficiency of the alkylene oxide reaction with cellulose is improved. In contrast with the alkylene oxide efficiencies in the range of 10 to 30 percent as achieved in the prior art, alkylene oxide efficiencies achieved with the present invention are usually at least 25 percent and often in excess of 40 percent. In the two-stage embodiments of this invention, alkylene oxide efficiencies as high as about 45 to 60 percent or more are often achieved. In addition, the total time required to prepare hydroxyalkylcellulose ethers and hydroxyalkylalkylcellulose ethers is significantly reduced with the practice of this invention. Reductions of about 10 to about 50 percent in reaction time are often seen with the practice of this invention. Significantly, despite the increased reaction efficiencies and reduced cycle times, the quality of the product prepared by this process is substantially equivalent to that of the products made in conventional methods. Moreover, for those cellulose ethers with high hydroxyalkoxyl substitution, the efficiency of the alkylene oxide reaction is increased, while the level of insolubles is substantially equivalent to the level in products prepared in conventional process. Insoluble levels (i.e., the percentage in weight of the cellulose ether which is insoluble in a suitable solvent) can be less than about 1 percent, preferably less than about 0.5 percent, more preferably less than 0.1 percent and most preferably less than about 0.05 percent.

The products made in the process of this invention may be employed in applications in which conventionally prepared cellulose ethers are employed. For example, these cellulose ethers may be employed as thickeners in latex paints, emulsion stabilizers, protective colloids, water retention aids, adhesives, matrices for sustained release pharmaceutical compositions and the like.

The following examples are provided to illustrate the invention but not to limit the scope thereof. All parts and percentages are by weight unless otherwise indicated.

EXAMPLES

Into a continuously agitated reactor is loaded 30 pounds of ground cotton linters. The head space of the reactor is evacuated and flooded with nitrogen. The reactor is heated to 30° C., and the pressure is about 760 mmHg. To the reaction vessel is sprayed 19 pounds of 50 weight percent sodium hydroxide solution while the cotton linters are sufficiently agitated. The reactor is heated to about 60° C. After the reaction proceeds for about 15 minutes, the pressure is lowered to about 175 mmHg, and 18 pounds of propylene oxide is added at the rate of 0.006 pounds per minute per pound of cellulose to the reaction mass. Substantially all of the propylene oxide is added in the form of a vapor. After the propylene oxide addition, about 10.5 pounds of a gas diluent, comprised of about 52 weight percent dimethyl ether, about 43 weight percent methyl chloride, and about 5 weight percent propylene oxide is added over about a 30 minute period. The temperature in the reaction vessel is raised to about 80° C. over a 30 minute period. About 21 pounds of 50 weight percent sodium hydroxide is added, and after a short period of mixing, about 36 pounds of methyl chloride are added at the rate of 0.3 pounds per minute. After the methyl chloride addition, the reaction is maintained at 80° C. for about one hour, and the product is recovered. The product is analyzed for insolubles content and propylene oxide efficiency, and the results are provided in Table I as Sample 1.

Samples 2, 3 and 4 are prepared as Sample 1, except that different initial pressures and propylene oxide addition rates are employed. The properties of the samples are provided in Table I.

For comparison, the reaction is repeated except that instead of continuously adding the propylene oxide and methyl chloride, a conventional one-stage etherification process with no continuous addition of reagent is used. The properties of the comparison samples are provided in Table I as C-1 and C-2.

Another comparative example is made by repeating the staged-continuous addition process of Samples 1–4, except that the propylene oxide is not added in the form of a vapor. The properties of this comparative example are provided in Table I as C-3.

TABLE I

| Sample No. | Initial[1] Pressure | Propylene Oxide[2] Addition Rate | Percent Methoxyl[3] | Percent Hydroxy-Propoxyl[4] | Methyl Chloride Efficiency[5] | Propylene Oxide Efficiency[6] | Percent Insolubles[7] |
|---|---|---|---|---|---|---|---|
| 1 | 175 | 0.006 | 20.2 | 25.4 | 53.8 | 42.6 | <0.05 |
| 2 | 140 | 0.01 | 19.0 | 26.9 | 51.1 | 43.4 | 0.15 |
| 3 | 123 | 0.013 | 19.3 | 27.5 | 52.4 | 44.7 | <0.05 |
| 4 | 138 | 0.04 | 19.9 | 27.3 | 54.0 | 44.5 | 0.05 |
| C-1* | — | — | 19.0 | 24.0 | 51.7 | 23.2 | <0.05 |
| C-2* | — | — | 19.5 | 22.9 | 52.8 | 21.9 | <0.05 |
| C-3* | 760 | 0.013 | 20.0 | 25.0 | 51.5 | 42.4 | 2.0 |

*Not an example of the invention.
[1]Initial pressure in the reactor in mmHg.
[2]Propylene oxide addition rate in pounds per minute per pound of cellulose.
[3]Methoxy substitution of the hydroxypropyl methylcellulose, expressed as a percentage of the total weight of the hydroxypropyl methylcellulose.
[4]Hydroxypropoxyl substitution on the hydroxypropyl methylcellulose, expressed as a percentage of the total weight of the hydroxypropyl methylcellulose.
[5]The percentage of methylchloride consumed in the reaction which reacted to form methyoxyl groups on the cellulose.
[6]The percentage of propylene oxide consumed in the reaction which reacted to form hydroxypropoxyl groups on the cellulose.
[7]Insolubles level measured as percentage in weight of the hydroxypropyl methylcellulose which is insoluble in water.

The data in the Table illustrates that the vaporization addition of propylene oxide in the staged-continuous addition process provides good propylene oxide reaction efficiency (Samples 1–4 v. C-1 and C-2), and a product with a low insolubles content (Samples 1–4 v. C-3).

What is claimed is:

1. In the process for preparing hydroxyalkylcellulose ethers and mixed hydroxyalkylalkylcellulose ethers having a high $C_2$ or higher hydroxyalkoxyl substitution, said process comprising the steps of
   (a) forming a reaction mass comprising cellulose and an amount of an alkali metal hydroxide at least sufficient to break up the crystallinity of the cellulose and to catalyze a reaction between the cellulose and an alkylene oxide and
   (b) continuously adding an etherifying agent comprising a $C_2$ or higher alkylene oxide to the reaction mass under conditions including an elevated temperature such that the alkylene oxide react with the cellulose to attach ether groups thereto;
the improvement characterized by performing said process under reaction conditions such that said alkylene oxide is added in the form of a vapor.

2. The improvement of claim 1, wherein said reaction conditions comprise providing an effectively low pressure.

3. The improvement of claim 2, wherein the alkylene oxide is added at a controlled rate.

4. The improvement of claim 2, wherein said pressure is less than about 400 mmHg.

5. The improvement of claim 4, wherein said pressure is less than about 175 mmHg.

6. The improvement of claim 5, wherein said pressure is less than about 120 mmHg.

7. The improvement of claim 4, wherein said temperature is between about 30° and about 140° C.

8. The improvement of claim 5, wherein said temperature is between about 40° and about 120° C.

9. The improvement of claim 6, wherein said temperature is between about 60° and about 90° C.

10. The improvement of claim 3, wherein said rate of addition of alkylene oxide is from about 0.003 to about 0.04 pounds per minute per pound of cellulose.

11. The improvement of claim 10, wherein said rate of addition of alkylene oxide is from about 0.006 to about 0.01 pounds per minute per pound of cellulose.

12. The improvement of claim 2, wherein said alkylene oxide is propylene oxide.

13. The improvement of claim 12, wherein the etherifying agent is methyl chloride.

14. The improvement of claim 12, wherein the etherifying agent is chloroacetic acid.

15. The improvement of claim 2, wherein said hydroxyalkylalkylcellulose ether product has a $C_2$ or higher hydroxyalkoxyl molar substitution of at least about 8 weight percent.

16. The improvement of claim 15, wherein said hydroxyalkoxyl molar substitution is at least about 21 weight percent.

17. The improvement of claim 16, wherein said hydroxyalkoxyl molar substitution is aa least about 30 weight percent.

18. In the process for preparing mixed hydroxyalkylalkylcellulose ethers having a high $C_2$ or higher hydroxyalkoxyl molar substitution, said process comprising the steps of
   (a) forming a reaction mass comprising cellulose and an amount of an alkali metal hydroxide not substantially in excess of that amount required to break up the crystallinity of the cellulose,
   (b) continuously adding to the reaction mass a $C_2$ or higher alkylene oxide under conditions including an elevated temperature such that a desired amount of hydroxyalkoxyl groups become attached to the cellulose, then (c) adding an incremental amount of an alkali metal hydroxide to the reaction mass and then (d) continually adding an etherifying agent which is not an alkylene oxide to the reaction mass under conditions including an elevated temperature such that a desired amount of ether groups become attached to the cellulose;

the improvement characterized by performing said process under reaction conditions such that said alkylene oxide is added in the form of a vapor.

19. The improvement of claim 18, wherein said reaction conditions comprise an effectively low pressure.

20. The improvement of claim 19, wherein said reaction conditions further comprise a controlled rate of alkylene oxide addition.

21. The improvement of claim 18, wherein said reaction conditions further comprise a controlled rate of alkylene oxide addition.

22. The improvement of claim 19, wherein said alkylene oxide is propylene oxide.

23. The improvement of claim 22, wherein said etherifying agent is a haloaliphatic carboxylic acid, an alkyl halide or a dialkyl sulfate.

24. The improvement of claim 23, wherein said etherifying agent is methyl chloride.

25. The improvement of claim 19, wherein said pressure is less than about 400 mmHg.

26. The improvement of claim 25, wherein said pressure is less than about 175 mmHg.

27. The improvement of claim 26, wherein said pressure is less than about 120 mmHg.

28. The improvement of claim 19, wherein said temperature is between about 30° and about 140° C.

29. The improvement of claim 28, wherein said temperature is between about 40° and about 120° C.

30. The improvement of claim 29, wherein said temperature is between about 60° and about 90° C.

31. The improvement of claim 25, wherein said temperature is between about 30° and about 140° C.

32. The improvement of claim 26, wherein said temperature is between about 40° and about 120° C.

33. The improvement of claim 27, wherein said temperature is between about 60° and about 90° C.

34. The improvement of claim 33, wherein said rate of addition of alkylene oxide is from about 0.003 to about 0.04 pounds per minute per pound of cellulose.

* * * * *